United States Patent
Blank, Sr.

(10) Patent No.: US 9,542,782 B2
(45) Date of Patent: Jan. 10, 2017

(54) AIRCRAFT LANDING AND TAKEOFF LOGGING SYSTEM

(71) Applicant: Justin James Blank, Sr., Eagle River, AK (US)

(72) Inventor: Justin James Blank, Sr., Eagle River, AK (US)

( * ) Notice: Subject to any disclaimer, the term of this patent is extended or adjusted under 35 U.S.C. 154(b) by 29 days.

(21) Appl. No.: 14/467,647

(22) Filed: Aug. 25, 2014

(65) Prior Publication Data

US 2016/0055687 A1 Feb. 25, 2016

(51) Int. Cl.
| | |
|---|---|
| G07C 5/08 | (2006.01) |
| G01S 19/01 | (2010.01) |
| G01S 17/08 | (2006.01) |
| G01S 17/88 | (2006.01) |
| G01S 17/93 | (2006.01) |
| G01S 19/45 | (2010.01) |

(52) U.S. Cl.
CPC ............... *G07C 5/085* (2013.01); *G01S 17/08* (2013.01); *G01S 17/88* (2013.01); *G01S 17/933* (2013.01); *G01S 19/01* (2013.01); *G01S 19/45* (2013.01); *G07C 5/0816* (2013.01)

(58) Field of Classification Search
USPC .......................................................... 701/4
See application file for complete search history.

(56) References Cited

U.S. PATENT DOCUMENTS

| | | | | |
|---|---|---|---|---|
| 6,853,332 | B1* | 2/2005 | Brookes | G01C 5/005 |
| | | | | 342/190 |
| 7,587,670 | B2* | 9/2009 | Snover | G06F 9/45512 |
| | | | | 715/234 |
| 8,119,971 | B2* | 2/2012 | Grund | G01S 7/4813 |
| | | | | 250/214 R |
| 8,370,075 | B2* | 2/2013 | Goldman | G01B 5/0035 |
| | | | | 702/19 |
| 8,997,248 | B1* | 3/2015 | McKay | H04L 63/102 |
| | | | | 726/27 |
| 9,077,577 | B1* | 7/2015 | Ashrafi | H04L 27/362 |
| 9,146,916 | B2* | 9/2015 | Moroze | |
| 9,331,875 | B2* | 5/2016 | Ashrafi | H04L 27/362 |
| 2003/0048357 | A1* | 3/2003 | Kain | B64D 47/08 |
| | | | | 348/144 |
| 2004/0130702 | A1* | 7/2004 | Jupp | G06K 9/0063 |
| | | | | 356/5.01 |
| 2004/0233414 | A1* | 11/2004 | Jamieson | G01S 7/4802 |
| | | | | 356/4.01 |
| 2005/0080794 | A1* | 4/2005 | Ledingham | G08G 5/0013 |
| 2007/0041396 | A1* | 2/2007 | Kanajan | H04J 3/1682 |
| | | | | 370/442 |
| 2008/0133513 | A1* | 6/2008 | Linde | G06Q 30/02 |

(Continued)

*Primary Examiner* — Jean-Paul Cass
(74) *Attorney, Agent, or Firm* — George C. Rondeau, Jr.; Davis Wright Tremaine LLP

(57) ABSTRACT

An aircraft logging system is disclosed. The aircraft logging system may be mounted on an aircraft and may be configured to generate a log of aircraft landing, takeoff or both. The aircraft logging system may have an independent power supply and may be electrically decoupled from the aircraft on which it is mounted. The aircraft logging system may include a sensor, such as an altimeter, that enables identifying the occurrence of a landing using emitted signals. The aircraft logging system includes a positioning device configured to provide a position measurement.

20 Claims, 5 Drawing Sheets

(56) References Cited

U.S. PATENT DOCUMENTS

| | | | |
|---|---|---|---|
| 2008/0158256 A1* | 7/2008 | Russell | G06T 7/0026 345/629 |
| 2009/0073034 A1* | 3/2009 | Lin | G01S 19/49 342/357.32 |
| 2009/0245581 A1* | 10/2009 | Dey | F17D 5/06 382/104 |
| 2010/0305782 A1* | 12/2010 | Linden | G01C 11/025 701/3 |
| 2011/0169946 A1* | 7/2011 | Rudin | G01S 5/16 348/135 |
| 2012/0066579 A1* | 3/2012 | Joshi | G06F 17/30867 715/221 |
| 2013/0059489 A1* | 3/2013 | Vlock | B63B 7/085 440/6 |
| 2013/0060514 A1* | 3/2013 | Burke | H04W 48/04 702/141 |
| 2013/0179078 A1* | 7/2013 | Griffon | G06Q 50/26 702/3 |
| 2014/0032020 A1* | 1/2014 | Guyette | G01S 19/54 701/3 |
| 2014/0297101 A1* | 10/2014 | Girod | B64D 45/00 701/33.4 |
| 2015/0032300 A1* | 1/2015 | Arethens | G01S 19/45 701/17 |
| 2016/0055687 A1* | 2/2016 | Blank, Sr. | G07C 5/085 701/4 |
| 2016/0127073 A1* | 5/2016 | Ashrafi | H04J 14/00 398/44 |

* cited by examiner

AIRCRAFT LANDING AND TAKEOFF LOGGING SYSTEM

BACKGROUND

Helicopters and other types of aircraft are often used to transport technicians and scientists visiting worksites located in remote or relatively uninhabited geographic areas. Many of these areas may be protected, whereby local, state or federal rules or regulations may require submission of an accounting or log of the locations of aircraft landing. Further, aircraft operators or other parties find that keeping such a log is beneficial. Requiring a pilot to keep a written record of the aircraft landing locations based on reading on-board aircraft instruments may prove to be burdensome as that would distract the pilot from performing flight checklist, among other responsibilities. Further, a manually-kept record is prone to errors and omissions.

Accordingly, it is desirable to have a system for recording the landing and takeoff locations of an aircraft. It is further desirable for the system to generate an electronic log of the geographic locations of aircraft landing and takeoff.

BRIEF DESCRIPTION OF THE DRAWINGS

Various embodiments in accordance with the present disclosure will be described with reference to the drawings, in which.

DETAILED DESCRIPTION

Described herein is an aircraft takeoff and landing logging system for recording a geographic position for aircraft landing and takeoff. The aircraft takeoff and landing logging system is also referred to herein as the logging system. The logging system may be mounted on the aircraft (for example, by attachment to a landing gear or another component of the aircraft) or may be carried in a cargo area of the aircraft. The logging system may generate a log of the geographic positions of the landing or takeoff of the aircraft. When mounted on a helicopter that is used to transport specialists to remote areas for exploration or for conducting measurements in work sites, the logging system may create a log of the location of landings and takeoffs made during such trips. Furthermore, when the helicopter is in flight, the logging system may create a record of the flight path of the helicopter.

The log created by the logging system may be used to satisfy regulatory requirements. For example, certain local and state regulations require companies or other operators to provide the landing locations of the aircraft used to visit sites within certain geographic areas such as parks or conservation areas. The log created by the logging system may be retrieved and submitted to comply with the regulatory requirements.

The logging system is advantageously self-contained and powered independently of the aircraft on which it is mounted. As is described herein, the logging system includes a source of electric power and, thus, to be operational, the logging system is not reliant or dependent on a power source within the aircraft. Accordingly, other than physical attachment to or mounting on an aircraft or associated cargo area, the logging system may be decoupled from the aircraft and its on-board equipment. Accordingly, the logging system may not be electrically connected to the circuit of the aircraft and may not interfere with the electric operation of the aircraft. Thus, the logging system may not be subject to Federal Aviation Administration (FAA) regulatory requirements that govern components and devices that are electrically coupled to the aircraft or that derive their power from an aircraft flying in the United States. In alternative embodiments, the logging system may draw electric power from the aircraft or on-board equipment thereof and may be subject to the FAA regulatory requirements.

Figure 1:
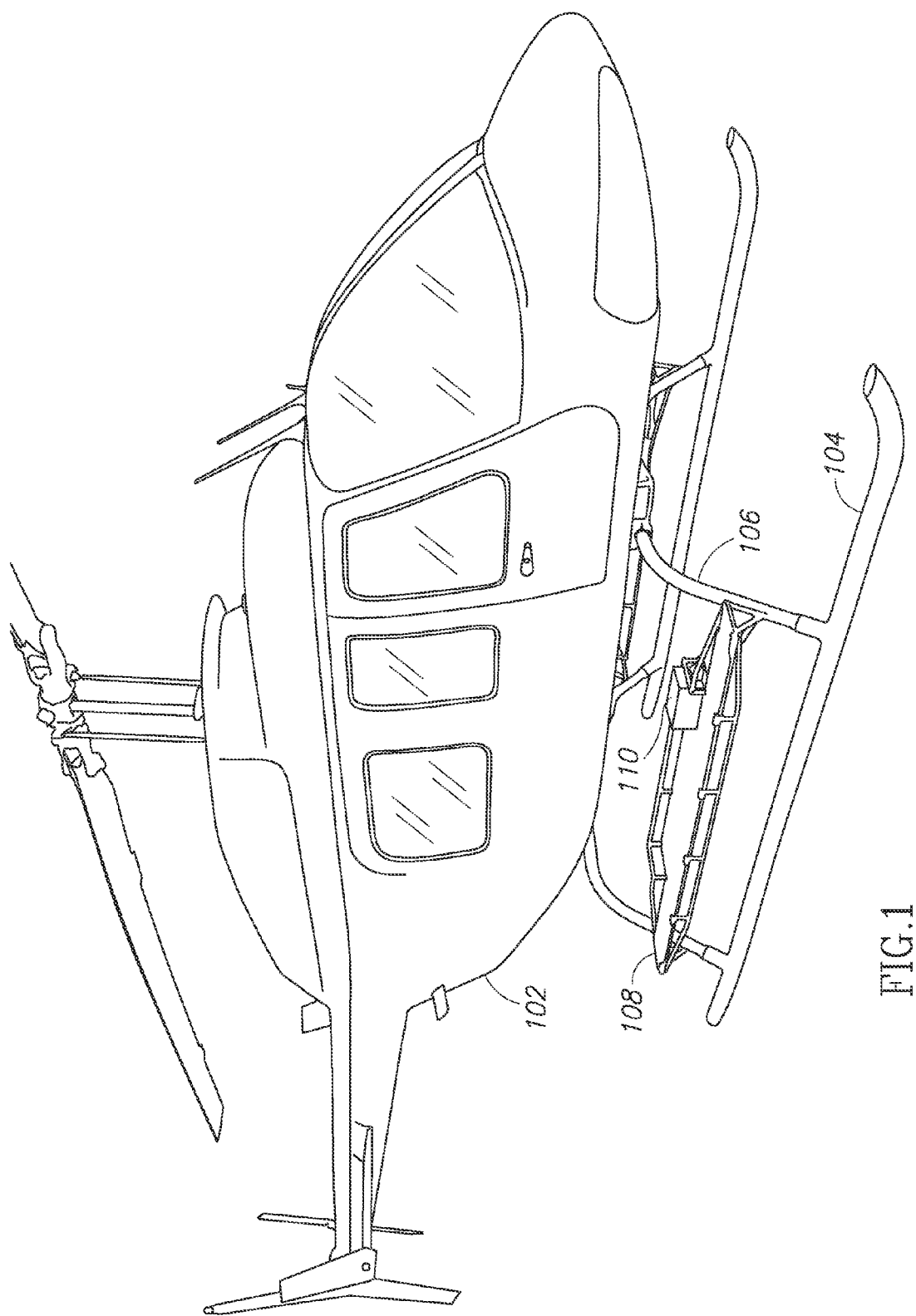
FIG. 1 shows a helicopter-mounted aircraft takeoff and landing logging system for recording landing and takeoff locations.

Making reference now to the drawings, FIG. 1 shows a helicopter-mounted aircraft takeoff and landing logging system for recording landing and takeoff locations. The helicopter 102 is equipped with landing skids 104 that are suspended from its fuselage by cross tubes 106, whereby the cross tubes 106 are used to support a cargo area 108 that may be used for carrying a load or mounting equipment. As shown in FIG. 1, the cargo area 108 is used to mount a logging system 110 for recording the landing and takeoff locations of the helicopter 102. Further, the logging system 110 may be used to track the location of the helicopter 102 during flight and generate a flight path for the helicopter 102. The logging system 110 is equipped with a positioning device, whereby upon the landing or takeoff of the helicopter, a trigger may cause the logging system 110 to record a position measurement of the helicopter with respect to the geographic coordinates of the Earth's surface.

The logging system 110 may be self-contained and internally powered without reliance on a source of power external to the logging system 110, such as a source of power provided by the helicopter 102 or an instrument or equipment thereof. The self-containment of the logging system 110 may be advantageous in that the logging system 110 may not be subject to regulatory requirements that are imposed on components that derive power from a power source of the helicopter 102. For example, in the United States, the FAA sets regulatory requirements governing aircraft components that derive electric power from the aircraft's onboard systems. The regulatory requirements may impose rigorous testing and maintenance guidelines that increase the cost of building, maintaining and using aircraft components. However, due to the fact that the logging system 110 is self-contained and does not interfere with the power of the helicopter, the logging system 110 may not be subject to the regulatory requirements. Accordingly, the logging system 110 may advantageously be economically built, tested and maintained.

Figure 2:
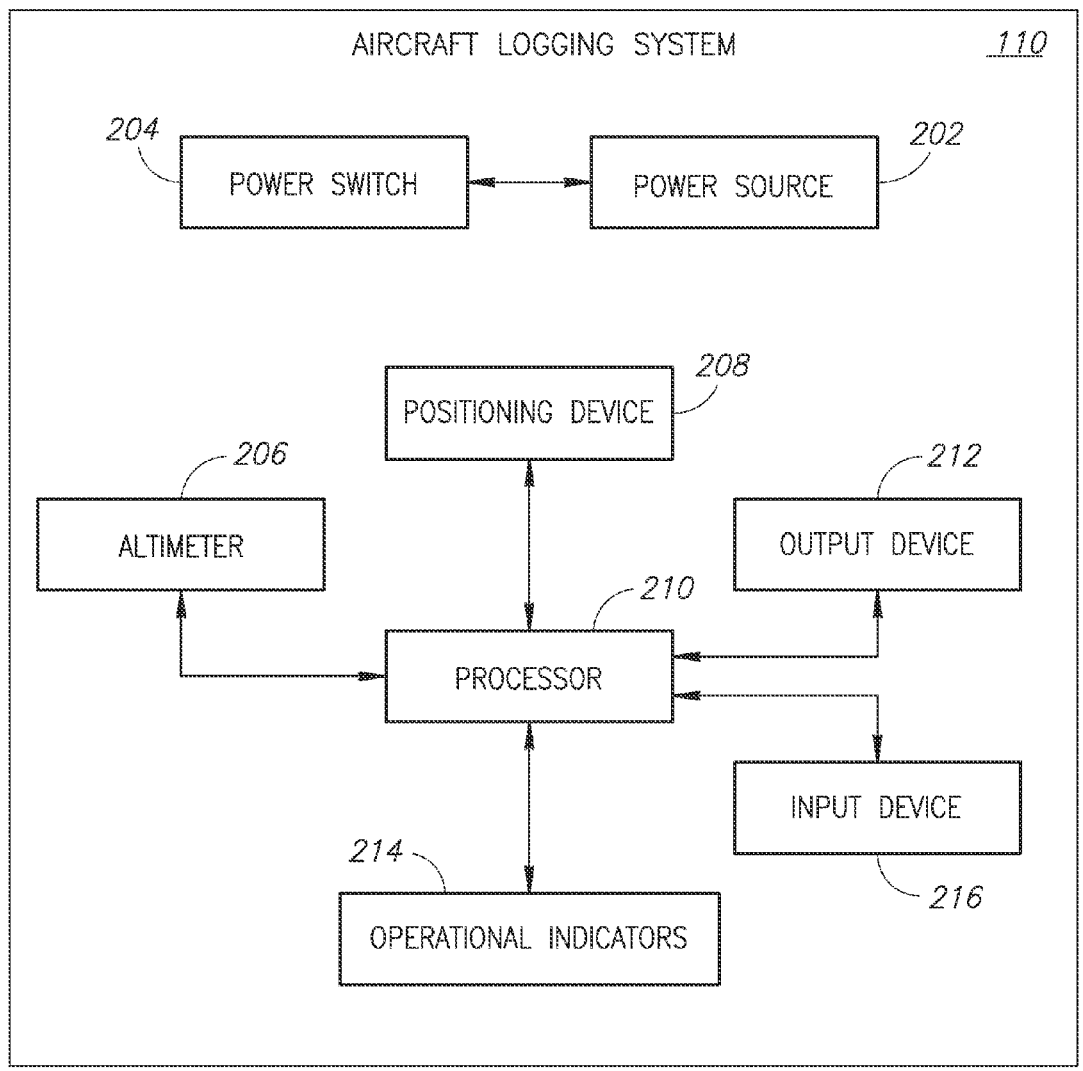
FIG. 2 shows a block diagram of the aircraft takeoff and landing logging system.

FIG. 2 shows a block diagram of one embodiment of the aircraft takeoff and landing logging system 110. The logging system 110 includes a power source 202, a power switch 204, an altimeter 206, a positioning device 208, a processor 210, an output device 212, operational indicators 214 and an input device 216. The power source 202 may be used to provide regulated electric power to the electric components of the logging system 110. The power source 202 may be a battery pack or solar-based power source, among others. For example, a solar panel may be used for generating electric power that charges a rechargeable battery of the logging system 110. The logging system 110 may be self-contained, whereby use of the battery pack or the solar panel may facilitate internally powering the logging system 110 without reliance on an external source of power. The output electric power of the power source 202 may be regulated to be compliant with components of the logging system 110.

The power switch 204 may be used to turn on or off the supply of power from the power source 202 to the remainder of the components of the logging system 110. The supply of power to the components of the logging system 110 may be turned off when the aircraft is not operational to conserve electric power and turned on when the aircraft is in use.

The altimeter 206 may be any type of altitude detection device, such as a laser altimeter or radar altimeter, among others. The altimeter 206 may be configured with a transceiver or any type of transmitter/receiver pair, such as an emitter and a photodetector. The altimeter 206 may be configured to measure a distance to an object, such as the Earth's surface or seawater. The distance measurement, which reflects the altitude of the aircraft on which the logging system 110 is mounted, may be based on the time elapsed from transmission of an electromagnetic wave to receipt of the wave as reflected by the object. The altimeter 206 of the logging system 110 may be configured such that the transmitter/receiver pair point downwardly from the aircraft and is mounted in order measure a vertical distance to a landing or takeoff location. Alternatively, when a laser altimeter is used, an emitter and photodetector pair may be configured to point in any direction transverse to the vertical direction and an appropriately configured mirror may be used to reflect light vertically as described herein.

The altimeter 206 may be configured to provide the measured altitude to the processor 210 periodically or due to a trigger, such as receipt of a request for altitude measurement. Alternatively, the altimeter 206 may be configured with a range of distances, whereby the altimeter 206 may be configured to provide an alarm or a signal to the processor 210 when an object is detected within the range. For example, if the logging system 110 is mounted 40 centimeters (cm) above ground on a stationary aircraft, the range of configured event triggering distances may be 50 cm to 1 meter (m). Accordingly, as the aircraft approaches a landing location and the measured altitude is detected between 50 cm to 1 m, an indication may be sent to the processor 210 to trigger a position measurement. It is noted that in various embodiments, an altitude detection device, such as a laser range finder or pressure switch, may be used for altitude detection or measurement. The altitude detection device may be used for triggering detecting the occurrence of a landing or takeoff event or generating a log entry associated with the landing or takeoff event.

The processor 210, which may be any type of processor or controller, such as the Atmel® Arduino™ microcontroller, among others, may be programmed using executable instructions that enable the processor 210 to determine that a landing or takeoff event has taken place, whereby the determination may be based on communication with the altimeter 206. In response to determining that the landing or takeoff event occurred, the processor 210 may be configured to record a position measurement provided by the positioning device 208. The processor 210 may have one or more input/output pins, ports or buses that enable the processor to communicate with the altimeter 206, positioning device 208 and other components of the logging system 110.

As described herein, the processor 210 may be configured to receive an indication from the altimeter 206 that an altitude measurement is within a configurable altitude range. Alternatively, the processor 210 may be configured to receive an altitude measurement from the altimeter 206 and determine whether a landing or takeoff event has taken place based on the altitude measurement and a configured altitude range or configured altitude threshold. For example, if the logging system 110 is mounted 40 cm above ground on a stationary aircraft and the processor 210 receives a first altitude measurement of 40 cm and subsequently a second altitude measurement of 5 m, the processor 210 may be configured to determine that a takeoff event has taken place due to the fact that the measured altitude increased above a threshold of 2 m.

Upon determining the occurrence of a landing or takeoff event, the processor 210 may configured to receive a position measurement from the positioning device 208 and record the position measurement in a landing or takeoff log. The positioning device 208 may be a global positioning system (GPS) device and may be configured to provide a position measurement comprising latitude and longitude measurements of its position with respect to the surface of the Earth. The positioning device 208 may determine the latitude and longitude measurement based on communication with Earth orbiting satellites. Further, the positioning device 208 may be configured to provide an elevation or altitude measurement.

Upon determining the occurrence of a landing or takeoff event the processor 210 may be configured to send a request for a position measurement to the positioning device 208. In response to sending the request for the position measurement, the processor 210 may receive the position measurement from the positioning device 208. Alternatively, the positioning device 208 may be configured to provide the processor 210 with position measurements (for example, periodically or according to an aperiodic schedule) and the processor may be configured to record the landing or takeoff position based on received position measurements.

Upon determining the occurrence of a landing or takeoff event, the processor 210 may be configured to provide the position measurement pertaining to the landing or takeoff to an output device 212. The output device 212 may be a port having a docked memory device, such as a synchronous dynamic random access memory (SDRAM) card or universal serial bus (USB) memory device. The processor 210 may be configured to generate a log entry including the position measurement as well as other parameters, such as an indication of the time of the landing or takeoff event. Further, the log entry may include an indication of whether the log entry pertains to a landing or takeoff event. The log entry may be included in a log that may be stored on the memory device. The log may be stored in a computer file, which may be a delimiter-separated values file such as a comma-separated values (csv) file, tab-separated values file or colon-separated values file, among others. Further, the computer file may be a text (txt) file or a Microsoft® Excel® file format having an xls file extension. Further, if the flight path of an aircraft is tracked, the processor 210 may be configured to record a log including periodically or aperiodically recorded position measurements. The memory device may be retrieved from the logging system 110 and loaded onto a computing device, such as a computer, tablet or smartphone, among others, for retrieving the log.

In various embodiments, the output device 212 may be a communication device that is compliant with any type of protocol including a short-range communication protocol, such a Bluetooth protocol or an Institute for Electrical and Electronic Engineers (IEEE) 802 protocol, or a long range communication, such a Third Generation Partnership Project (3GPP) Long Term Evolution (LTE) or Evolved High Speed Packed Access (HSPA+) protocol, among others. In addition or as an alternative to storing the log in the memory device, the processor 210 may be configured to store the log on an accompanying memory device, such as flash memory, and transmit the log using the output device 212 to a receiving computer.

The logging system 110 also includes one or more operational indicators 214 that may signify to a user the operational state of the logging system 110. The operational indicators 214 may be appropriately labeled light emitting diodes (LEDs). Further, a display, such as a liquid crystal display (LCD) screen, may be used to provide the indicators. The indicators 214 may signify a charge level associated with a battery pack of the logging system 110. Further, the indicators 214 may signify whether the logging system 110 is powered or whether the power source 202 is malfunctioning. In addition, the indicators 214 may signify whether the processor 210 detected a failure in writing data for storage using the output device 212. Furthermore, the indicators 214 may specify whether the positioning device 208 has obtained a "fix" on Earth orbiting satellites. As may be recognized, the positioning device 208 may identify position measurements only after having appropriately communicated with Earth orbiting satellites. Following powering the positioning device 208, a period of time may be required to have lapsed before obtaining a "fix" to Earth orbiting satellites.

As shown in FIG. 2, the logging system 110 also includes an input device 216, whereby the input device 216 may be a USB port among others. The input device 216 may be used to connect the logging system 110 to an external computer system, whereby the computer system may be used for configuring the logging system 110. For example, altitude thresholds or ranges may be configured depending on a mounting height of the logging system 110. In an embodiment, a user interface (for example, that is executed on the computer system) may be provided. The user interface may permit a user to specify a mounting height of the logging system 110 or thresholds for detecting the occurrence of landing and takeoff events and triggering log entry generation. Furthermore, the user interface may be dials or a keypad, among other input devices, whereby the logging system 110 may be configured with the user interface to allow a user to set the mounting height or thresholds, among others.

Figure 3:
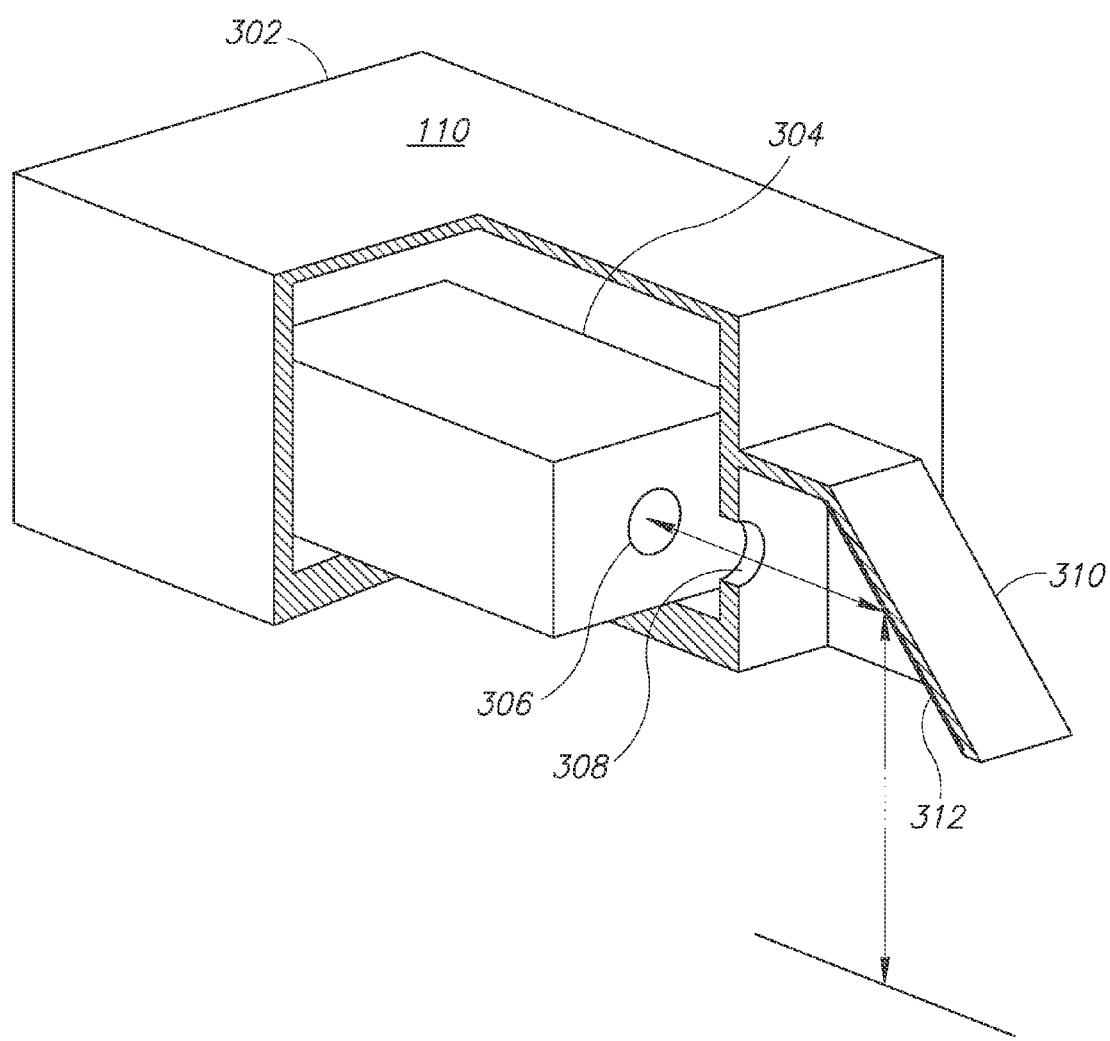
FIG. 3 shows an embodiment of the aircraft takeoff and landing logging system configured with a laser altimeter.

FIG. 3 shows an embodiment of the aircraft takeoff and landing logging system 110 configured with a laser altimeter. The logging system 110 has a housing 302, which may be a plastic or metal case. Furthermore, the housing 302 may be waterproof so as to protect the electrically-operated components of the logging system from environmental conditions. As described herein, the logging system 110 has a laser altimeter 304 that is configured to measure an altitude of an aircraft on which the logging system 110 is mounted. The altitude measurement is based on a reflection time of a laser beam emitted and captured by a photo emitter and photodetector pair (referenced by the numeral "306" in FIG. 3). The laser altimeter 304 is advantageously positioned such that the photo emitter and photodetector pair emits the laser beam and detects a reflection thereof along a horizontal axis. The positioning enables mounting the logging system housing 302 on a solid surface without obstructing a downward vertical line-of-sight of the photo emitter and photodetector pair to the Earth's surface.

To enable obtaining an altitude measurement, a sidewall of the housing 302 is configured with an aperture 308 permitting passage of both the laser beam and its reflection. Furthermore, the housing 302 is configured with an outwardly project chamber 310 positioned adjacent to the sidewall. The chamber 310 supports a mirror 312 for reflecting laser beams between the photo emitter and photodetector pair and the external environment. If the photo emitter and photodetector pair is positioned to horizontally emit and capture laser beams, the mirror 312 may be positioned at a 45 degree angle with respect the horizontal axis. Accordingly, the mirror 312 may reflect a horizontally emitted laser beam vertically downwardly, and vice-versa. The horizontal distance between the photo emitter and photodetector pair and the mirror 312 may be substantially less than the vertical mounting distance of the housing 302 such that the contribution of horizontal distance to the altitude measurement of the aircraft is negligible and a sufficiently accurate altitude measurement may be obtained. Further, horizontal distance may be compensated for in altitude determination. The outwardly projecting chamber 310 is advantageous in that the housing 302 may be mounted on an edge of any solid surface, whereby the chamber 310 may project beyond the solid surface so as to provide a vertical line-of-sight between the mirror 312 and the landing ground of the helicopter or other aircraft.

Figure 4:
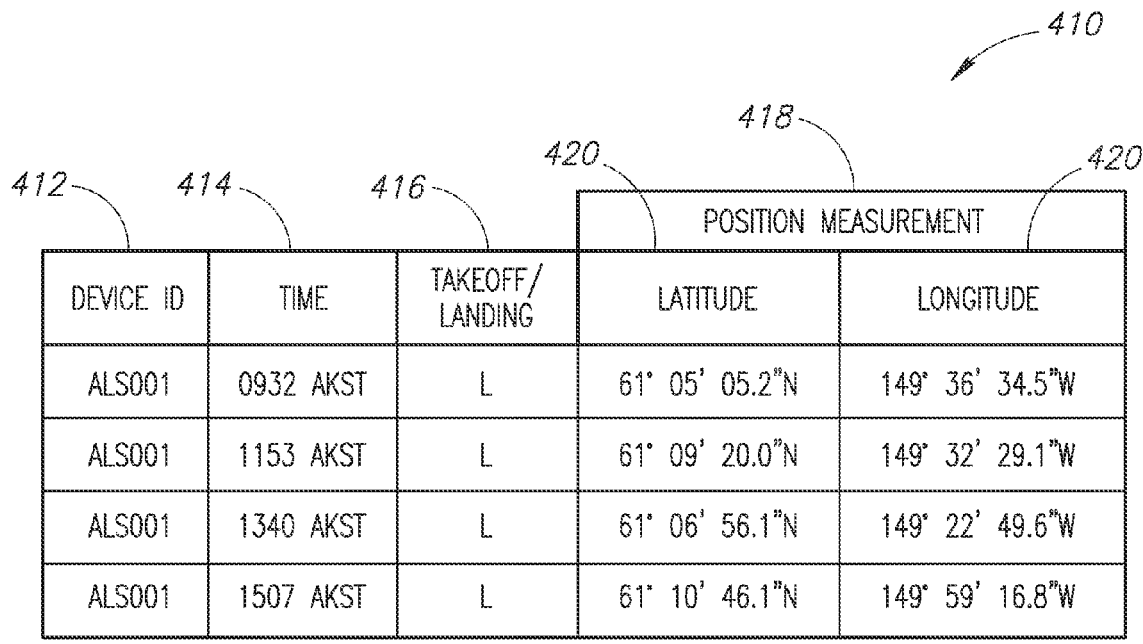
FIG. 4 shows an example of logs generated by the aircraft takeoff and landing logging system.
Figure 4:
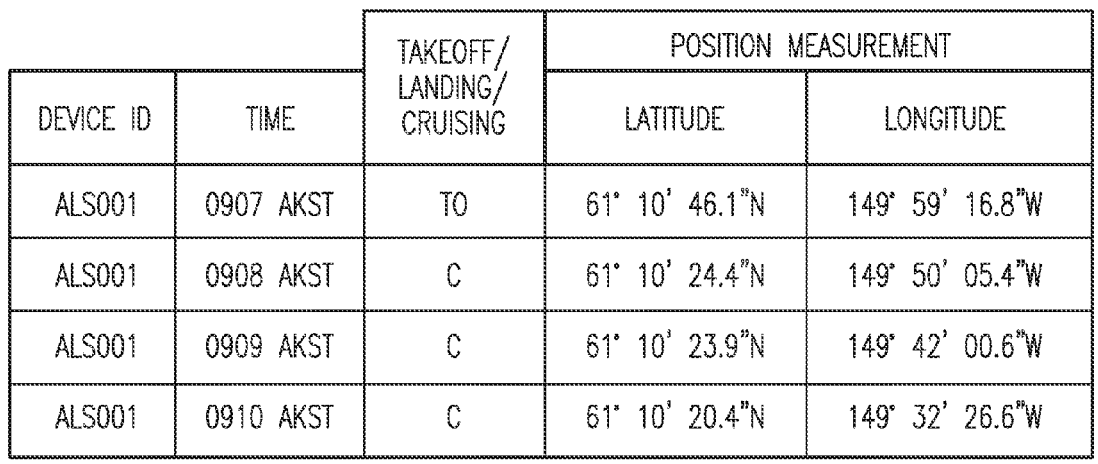

FIG. 4 shows an example of logs generated by the aircraft takeoff and landing logging system. A first log 410 captures aircraft landing locations and a second log 430 captures a flight path of the aircraft. Each log comprises a plurality of log entries, whereby each log entry includes an identity 412 of the logging system generating the log as well as an indication of the time 414 associated with each log entry. The identity 412 of the logging system may be used to distinguish between logs generated by a plurality of logging systems that may each be mounted on an aircraft of a fleet of aircraft.

A log entry further includes an event type 416 that indicates whether the log entry pertains to aircraft takeoff, landing or cruising. Further, the log entry includes a position measurement 418 comprising a latitude position measurement 420 and a longitude position measurement 422. A logging system producing the first log 410 may be configured to generate a log entry whenever an aircraft landing event is detected. However, a logging system producing the second log 430 may be configured to generate a log entry when a takeoff event is detected as well as periodically (for example, every minute) throughout an aircraft flight.

Figure 5:
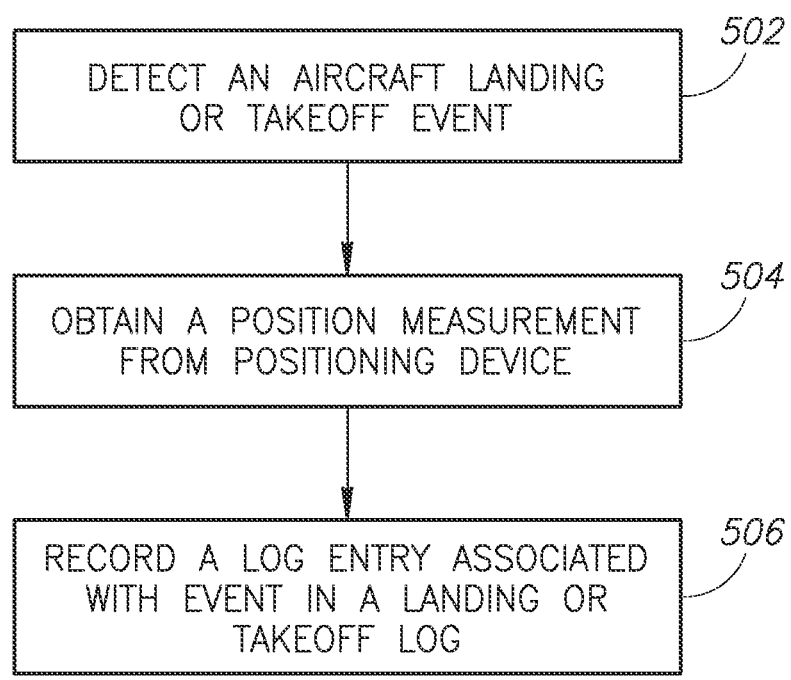
FIG. 5 shows a flow diagram of a method for recording a landing or takeoff event by the aircraft takeoff and landing logging system.

FIG. 5 shows a flow diagram of a method for recording a landing or takeoff event by the aircraft takeoff and landing logging system. A processor of the logging system, such as the processor described with reference to numeral 210 in FIG. 2, detects 502 an aircraft landing or takeoff event. Detecting the aircraft landing or takeoff event may be as a result of receiving an altitude measurement from an altimeter, such as the altimeter described with reference to numeral 206 in FIG. 2. For example, the processor may detect a landing event if the received altitude measurement is determined to be below a threshold. Further, a takeoff event may be detected if the received altitude measurement is determined to have increased above a threshold (for example, as compared to a previously received measurement). In addition, an aircraft cruising event may be detected if two subsequent position measurements are determined to be above the threshold.

The processor then obtains 504 a position measurement from a positioning device, such as the positioning device described with reference to numeral 208 in FIG. 2. The position measurement may include a longitude and latitude measurement with respect to the surface of the Earth. The processor then records 506 a log entry associated with the event in a landing or takeoff log. As described herein, the log entry may include a position measurement, a time associated with the detected event and an identity associated with the logging system.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. A self-contained aircraft logging system comprising:
    a housing configured for removable attachment to an aircraft;
    a power source configured to supply electric power to the aircraft logging system, the supplied electric power being independent of on-board power supply of the aircraft;
    an altimeter configured to provide an altitude measurement of the aircraft logging system;
    a positioning device configured to provide a position measurement of the aircraft logging system; and
    a controller independent of aircraft electronics and contained within the housing, the controller configured to:
        receive the altitude measurement from the altimeter;
        determine whether the altitude measurement received corresponds to an aircraft event that is at least one of an aircraft takeoff and an aircraft landing; and
        in response to determining an occurrence of the aircraft event, store, in a computer file, an aircraft event log entry identifying the occurrence of the aircraft event, the aircraft event log entry including the position measurement provided by the positioning device at the occurrence of the aircraft event.

2. The aircraft logging system of claim 1, wherein the controller is configured to determine the occurrence of the aircraft event based on the altitude measurement being within a first range of altitude parameters.

3. The aircraft logging system of claim 1, wherein the controller is configured to determine the occurrence of the aircraft event based on the altitude measurement being greater than a specified altitude threshold.

4. The aircraft logging system of claim 1, further comprising a memory device configured to store the aircraft log entry in association with the aircraft event.

5. The aircraft logging system of claim 1, wherein determination of whether the altitude measurement received corresponds to the aircraft event is based on whether the altitude measurement received crosses a specified altitude threshold in comparison with a second altitude measurement previously received from the altimeter.

6. The aircraft logging system of claim 1, wherein the aircraft log entry further includes an indication of a time or date of the occurrence of the aircraft event.

7. The aircraft logging system of claim 1, wherein the log entry further includes an aircraft event identifier specifying whether the occurrence of the aircraft event is an aircraft landing event or an aircraft takeoff event.

8. The aircraft logging system of claim 1, wherein the positioning device is a global positioning system (GPS) device and the position measurement comprises a latitude position measurement and a longitude position measurement.

9. The aircraft logging system of claim 1, wherein the housing includes an aperture, the altimeter is at least partially contained within the housing, and the altimeter projects a measurement signal through the aperture to obtain the altitude measurement.

10. An aircraft logging system for removably mounting on an aircraft, the aircraft logging system comprising:
    a housing removably mountable to the aircraft;
    a power source configured to supply electric power to the aircraft logging system, the supplied electric power being decoupled from on-board power supply of the aircraft;
    an altimeter configured to provide an altitude measurement of the aircraft logging system;
    a positioning device configured to provide a position measurement of the aircraft logging system; and
    a memory device configured to store a computer file including one or more log entries;

a controller independent of aircraft electronics and contained within the housing of the aircraft logging system, the controller configured to:
  detect, based on the altitude measurement, an occurrence of an aircraft landing;
  detect, based on the altitude measurement, an occurrence of an aircraft takeoff;
  in response to detecting the occurrence of the aircraft landing, generate a landing log entry including the position measurement during the occurrence of the aircraft landing and a time or date of the occurrence of the aircraft landing, and write the generated landing log entry to the computer file; and
  in response to detecting the occurrence of the aircraft takeoff, generate a takeoff log entry including the position measurement during the occurrence of the aircraft takeoff and the time or date of the occurrence of the aircraft takeoff, and write the generated takeoff log entry to the computer file.

11. The aircraft logging system of claim 10, wherein the controller is configured to detect the occurrence of the aircraft landing based on the altitude measurement being within a first range of altitude parameters.

12. The aircraft logging system of claim 10, wherein the controller is configured to detect the occurrence of the aircraft takeoff based on the altitude measurement being greater than a specified altitude threshold.

13. The aircraft logging system of claim 10, wherein the computer file is a delimiter-separated values file.

14. The aircraft logging system of claim 10, wherein each generated landing log entry includes a landing event identifier specifying that the landing log entry corresponds to the occurrence of the aircraft landing, and each generated takeoff log entry includes a takeoff event identifier specifying that the takeoff log entry corresponds to the occurrence of the aircraft takeoff.

15. The aircraft logging system of claim 10, wherein the positioning device is a global positioning system (GPS) device and the position measurement comprises a latitude position measurement and a longitude position measurement.

16. The aircraft logging system of claim 10, wherein the power source is a battery pack or a solar-powered panel.

17. The aircraft logging system of claim 10, wherein the landing log entry and the takeoff log entry further include an identity associated with the aircraft logging system.

18. An aircraft logging system comprising:
  an independent power source;
  an altitude detection device configured to measure a distance between the aircraft logging system and an Earth surface;
  a positioning device configured to provide a position measurement of the aircraft logging system;
  a memory device configured to store one or more log entries;
  a housing removably attachable to an exterior of an aircraft;
  a controller independent of aircraft electronics and contained in the housing, the controller configured to:
    receive, from the altitude detection device, a first measured distance between the aircraft logging system and the Earth surface at a first time;
    receive, from the altitude detection device, a second measured distance between the aircraft logging system and the Earth surface at a second time after the first time;
    compare the first measured distance and the second measured distance to a predetermined distance threshold; and
    generate, in response to determining that (1) one of the first measured distance and the second measured distance exceeds the predetermined distance threshold, and (2) an other of the first measured distance and the second measured distance is less than the predetermined distance threshold, a log entry indicating an occurrence of one of an aircraft takeoff event and an aircraft landing event, the log entry including the position measurement of the aircraft logging system.

19. The aircraft logging system of claim 18, wherein the altitude detection device is configured to detect an aircraft landing if the Earth surface is detected by the altimeter to be within a specified distance from the aircraft logging system.

20. The aircraft logging system of claim 18, wherein the altitude detection device is a laser altimeter or a radar altimeter.

* * * * *